United States Patent [19]
Timko

[11] Patent Number: 5,849,250
[45] Date of Patent: Dec. 15, 1998

[54] AUXILIARY CATALYTIC CONVERTER HAVING A BACK PRESSURE RELIEF DEVICE

[76] Inventor: Mark Timko, 451 Erico Ave., Elizabeth, N.J. 07202

[21] Appl. No.: 794,163

[22] Filed: Feb. 3, 1997

[51] Int. Cl.[6] .............................. B01D 53/34; F01N 3/10
[52] U.S. Cl. .................... 422/177; 422/171; 422/179; 422/180; 422/211; 422/221; 422/222; 55/DIG. 30; 60/287; 60/288; 60/299
[58] Field of Search ................................ 422/171, 174, 422/177, 180, 179, 199, 211, 221, 222; 55/DIG. 30; 60/229, 300, 287, 288; 181/227, 228, 258

[56] References Cited

U.S. PATENT DOCUMENTS

| | | | |
|---|---|---|---|
| 3,675,398 | 7/1972 | Giarrizzo | 55/DIG. 30 |
| 3,768,982 | 10/1973 | Kitzner et al. | 422/174 |
| 3,905,775 | 9/1975 | Sowards et al. | 422/180 |
| 4,416,674 | 11/1983 | McMahon et al. | 422/171 |
| 4,530,418 | 7/1985 | Currie | 181/227 |
| 4,665,690 | 5/1987 | Nomoto et al. | 422/178 |
| 4,702,075 | 10/1987 | Jenny | 60/288 |
| 4,920,746 | 5/1990 | Gebelius | 60/299 |
| 5,218,817 | 6/1993 | Urata | 60/299 |

FOREIGN PATENT DOCUMENTS 3518756  11/1986  Germany .

*Primary Examiner*—Hien Tran
*Attorney, Agent, or Firm*—Ezra Sutton

[57] ABSTRACT

The present invention provides an auxiliary catalytic converter having a back pressure relief device being disposed after the main catalytic converter or after the muffler system which further reduces vehicle exhaust emissions from exhaust emission systems and that will meet the more stringent emission requirements of state and federal government regulations. The auxiliary catalytic converter includes a ceramic or steel housing of relatively small size, having a diameter in the range of 1 inch to 8 inches and a length of 4 inches to 11 inches. The housing includes a matrix core of catalytic layered materials which react with the gaseous exhaust emission pollutants, such as $NO_x$, NHMC, HC, and CO. These pollutants are further reduced and oxidized by the auxiliary catalytic converter using typical catalytic materials of platinum, palladium, rhodium, or the like contained within the honeycombed or meshed layers of the matrix core. The auxiliary catalytic converter is lodged within the interior of the exhaust piping. The auxiliary catalytic converter is held in place by mounting clamps, mounting screws, mounting brackets, or the like.

32 Claims, 6 Drawing Sheets

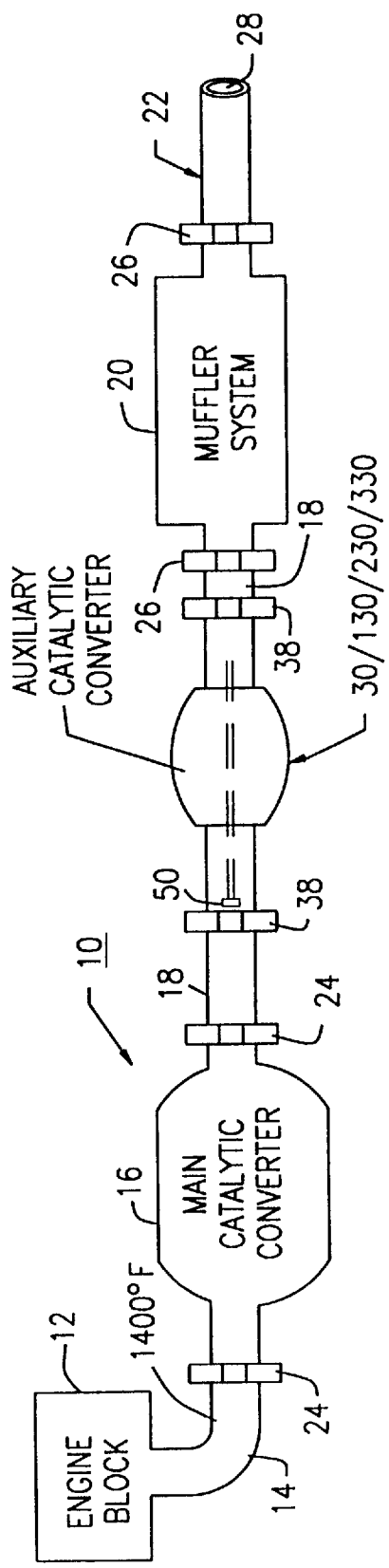
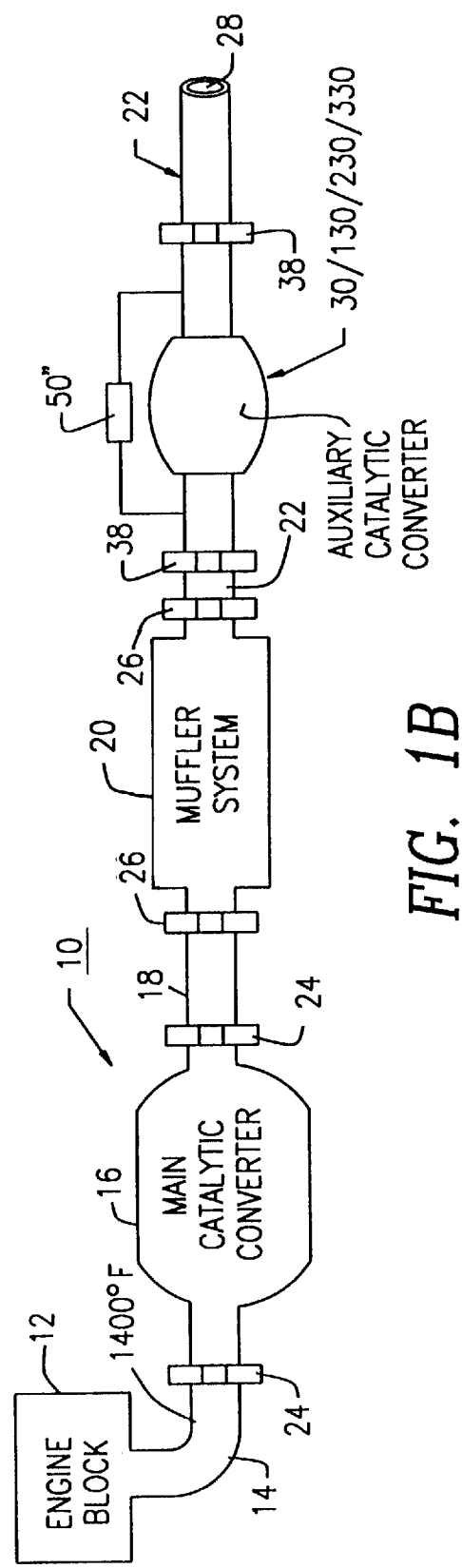
FIG. 1A
FIG. 1B

AUXILIARY CATALYTIC CONVERTER HAVING A BACK PRESSURE RELIEF DEVICE

FIELD OF THE INVENTION

This invention relates to an auxiliary catalytic converter having a back pressure relief device for exhaust gases from an internal combustion engine. More particularly, this invention relates to an auxiliary catalytic converter being disposed downstream of the main catalytic converter to further reduce pollution emissions from standard vehicle emission systems with a relief valve to maintain the back pressure of the emission system at a predetermined level to maintain the efficiency of the system.

BACKGROUND OF THE INVENTION

The exhaust emission gases generated by internal combustion engines found in automobiles, trucks, vans, and motorcycles are exhausted through a standard exhaust system, The standard exhaust system typically incudes small diameter exhaust pipes extending from the engine block manifold to a catalytic converter; the catalytic converter is attached to a muffler device by a small connecting exhaust pipe; and an extended tailpipe is connected to the remote end of the muffler, the tailpipe having an open end to exhaust the emission gases to the atmosphere.

In recent years, emission standards issued by federal and state governments for vehicles have become increasingly stricter, so that the exhaust system catalytic converter is required to eliminate unburned hydrocarbons from the exhaust gases. The catalytic converters come in a variety of designs but typically have a precious metal catalyst, such as platinum, palladium, and/or rhodium, all plated over alumina or on a substrate of extruded ceramics. The catalytic converter designs are typically simple housings containing catalytic alumina pellets and, in some cases, have more complex containment systems, including honeycombed or meshed passageways containing a catalytic substrate. In all cases, the catalytic converter acts to oxidize the hydrocarbon emissions which reduces the pollutants emitted to the atmosphere.

Because of the stricter standards, a need exists for an improved emission exhaust system which further reduces the hydrocarbon emissions in order to meet the new vehicle federal and state standards for emission levels of $NO_x$, HC, CO, and NMHC. None of the prior art structure and methods of reducing vehicle emissions for meeting the new federal and state emission guidelines discloses an auxiliary catalytic converter being disposed downstream of the main catalytic converter either before or after the muffler system and having a back pressure relief valve that maintains the back pressure of the emission system at a predetermined level to maintain the efficiency of reducing vehicle emissions while in use.

DESCRIPTION OF THE PRIOR ART

Catalytic converters of various designs and composite construction for vehicles have been disclosed in the prior art for many years. For example, U.S. Pat. No, 3,492,098 to DePalma et al discloses a catalyst device having spherical discs with the active catalyst located between the engine manifold and muffler and/or in the exhaust pipe section. U.S. Pat. Nos. 3,771,967 and 3,861,981 to Nowak disclose a honeycomb catalyst element located between the engine manifold exhaust system and muffler. U.S. Pat. No. 3,905,775 to Sowards et al discloses a cylindrical catalytic honeycombed module located between the engine manifold exhaust system and the muffler. U.S. Pat. No. 5,110,561 to Hitachi et al discloses a honeycomb core catalyst device that is generally installed at an intermediate point of an exhaust pipe. These aforementioned patents do not disclose an auxiliary catalytic converter having a back pressure relief valve, as in the present invention, to maintain the efficiency of the system.

U.S. Pat. No. 4,530,418 to Currie discloses an improved catalytic exhaust system which uses the entire length of the system from the engine exhaust manifold to the end of the tailpipe opening. This system would replace the standard automotive catalytic converter and muffler and perform the essential functions of muffling noise and converting unburned hydrocarbons. U.S. Pat. No. 4,920,746 to Gebelius discloses a catalytic exhaust system which uses the entire length of the exhaust system from the engine exhaust manifold to the end of the tailpipe. This system would also replace standard catalytic converters and mufflers on cars. U.S. Pat. No. 5,218,817 to Urata discloses a silencer having a catalyst disposed therein. U.S. Pat. No. 4,020,539 discloses a catalytic reactor having an inlet and an outlet. These patents do not disclose an auxiliary catalytic converter having a back pressure relief valve, as in the present invention.

German Patent No. DE3518756A1 discloses a catalytic converter to be disposed at various points in the exhaust system, such as at the joint of the muffler to the exhaust system. This patent does not disclose an auxiliary catalytic converter having a back pressure relief valve, as in the present invention.

Accordingly, it is an object of the present invention to provide an auxiliary or second catalytic converter having a back pressure relief valve disposed downstream of the main catalytic converter or downstream of the muffler to maintain efficiency and to thereby further reduce exhaust gas emissions to meet federal and state emission standards.

Another object of the present invention is to provide an auxiliary catalytic converter having a back pressure relief valve that maintains the back pressure of the emission system at a predetermined level.

Another object of the present invention is to provide an auxiliary catalytic converter having a back pressure relief valve that allows excess back pressure to be diverted from the auxiliary catalytic converter and to bypass the inner core to maintain the efficiency of the system.

Another object of the present invention is to provide an auxiliary catalytic converter having a back pressure relief valve that is in the form of either a bleed valve, or a miniature check valve, or a miniature pressure relief valve for relieving any build-up of pressure within the emission system at the inlet side of the auxiliary catalytic converter to maintain the efficiency of the system.

Another object of the present invention is to provide an auxiliary catalytic converter that will slow the travel time of exhaust gases through the main catalytic converter, such that the added residence time through the main catalytic converter will further reduce the emission of gaseous pollutants from the exhaust emission system of the motor vehicle while in use.

Another object of the present invention is to provide an auxiliary catalytic converter disposed downstream of the main catalytic converter and before the end of the tailpipe that is easy and simple to connect to the exhaust piping by mounting clamps, hose clamps, muffler clamps, compression fittings, mounting brackets, mounting screws, welding, crimping, or the like.

Another object of the present invention is to provide an auxiliary catalytic converter that is mounted internally within the emission exhaust piping between the main catalytic converter and the end of the tailpipe.

Another object of the present invention is to provide an auxiliary catalytic converter that in operational use performs with no reduction or loss of horsepower to a vehicle.

Another object of the present invention is to provide an auxiliary catalytic converter that in operational use provides substantially cleaner air emissions for a vehicle having installed the auxiliary catalytic converter of the present invention.

A further object of the present invention is to provide an auxiliary catalytic converter for an emission system that is only changed at every 50,000 to 100,000 miles of driving use.

A still further object of the present invention is to provide an auxiliary catalytic converter for an emission system which can be mass produced in an automated and economical manner and is relatively inexpensive and long lasting.

SUMMARY OF THE INVENTION

The present invention provides an auxiliary catalytic converter having a back pressure relief device disposed downstream of the main catalytic converter or after the muffler system which further reduces vehicle exhaust emissions from exhaust emission systems and that will meet the more stringent emission requirements of state and federal government regulations. The auxiliary catalytic converter comprises a ceramic or steel housing of relatively small size, having a diameter in the range of 1 inch to 8 inches and a length of 4 inches to 11 inches. Disposed in the housing is a matrix core of catalytic layered materials which react with the exhaust emission pollutants, such as $NO_x$, NMHC, HC, and CO. These pollutants are further reduced and oxidized by the auxiliary catalytic converter by the typical catalytic materials of platinum, palladium, rhodium, or the like contained within the honeycombed or meshed layers of the matrix core. The auxiliary catalytic converter is lodged within the interior of the exhaust pipe or the tailpipe. The auxiliary catalytic converter is held in place by any suitable means, such as a clamp, mounting screws, mounting brackets, or the like. The auxiliary catalytic converter can be used for other vehicles, such as trucks and motorcycles or other gas compression engines, i.e., lawn mowers.

Empirical data has been obtained (shown below) on different vehicles, with and without an auxiliary catalytic converter in the exhaust pipe or in the tailpipe, and with or without insulation surrounding the auxiliary catalytic converter to show the advantages of the present invention.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein:

FIG. 1A is a schematic diagram of a standard vehicle emission exhaust system incorporating the auxiliary catalytic converter of the present invention which is disposed downstream of the main catalytic converter;

FIG. 1B is a schematic diagram of a standard vehicle emission exhaust system incorporating the auxiliary catalytic converter of the present invention which is disposed downstream of the muffler system;

DETAILED DESCRIPTION OF THE PREFERRED AND ALTERNATE EMBODIMENTS

Overview

Figure 2:
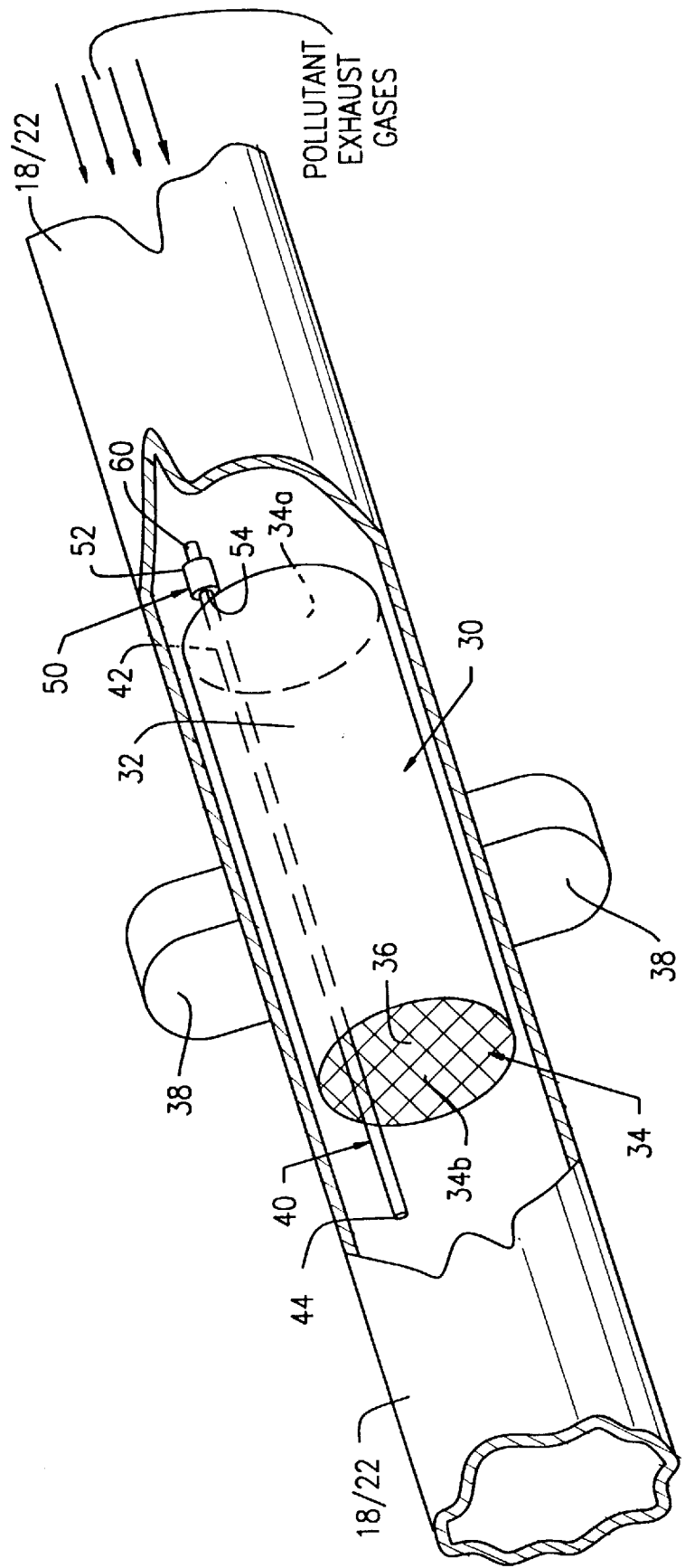
FIG. 2 is a perspective view of the auxiliary catalytic converter of the preferred embodiment of the present invention showing the major component parts contained therein and in operational use.

The auxiliary catalytic converters 30, 130, 230, and 330 having back pressure relief devices 50, 50', 50'', and 350, respectively, of the preferred and alternate embodiments 10, 100, 200, and 300 are represented in detail in FIGS. 1A, 1B and 2 through 6. FIG. 1A shows a standard and conventional exhaust emissions system 10 for a typical motor vehicle where the auxiliary catalytic converter 30, 130, 230 and 330 is disposed downstream of the main or primary catalytic converter 16. FIG. 1B shows a standard and conventional exhaust emissions system 10 for a typical motor vehicle where the auxiliary catalytic converter 30, 130, 230, and 330 is disposed after the muffler system 20. This standard exhaust emission system 10 comprises an exhaust manifold duct 14 connected to an internal combustion engine 12, and the manifold duct 14 is also connected to the main catalytic converter 16 having an exhaust pipe 18. Exhaust pipe 18 is connected to a conventional muffler 20 and an elongated exhaust tailpipe 22, which is part of the exhaust piping. As previously stated, the auxiliary catalytic converters 30, 130, 230, and 330 having the back pressure relief devices 50, 50', 50'' and 350, respectively, are disposed within the exhaust emissions system 10 between the main catalytic converter 16 and the end opening 28 of the elongated tailpipe 22, as depicted in FIGS. 1A and 1B of the drawings. The main catalytic converter 16 is held in place by mounting clamps 24, the muffler system 20 is held in place by mounting clamps 26, and the auxiliary catalytic converter is held in place by mounting clamps 38 for exhaust emission system 10.

THE PREFERRED EMBODIMENT

The auxiliary catalytic converter 30, as depicted in FIG. 2, is of generally conventional construction and includes a cylindrical housing 32 having disposed therein a matrix core 34 of catalytic layered material 36, which reacts with the emission of gaseous pollutants, such as THC, $NO_x$, NMHC, and CO. The matrix core 34 has an inlet side or end 34a and an outlet side or end 34b. Within matrix core 34 there is embedded a small diameter outlet tube 40 having an inlet end 42 and an outlet end 44. A back pressure relief device 50 is mounted at the inlet end 42 and has inlet and outlet openings 52 and 54 for relieving any build-up of excess back pressure at the inlet end 34a.

The back pressure relief device 50 can be in the form of a bleed valve, a miniature check valve, a miniature pressure release valve, or any other suitable devices. In this preferred embodiment, the back pressure relief device 50 is in the form of a bleed valve 50. Bleed valve 50 is always open and is dimensionally sized such that the exhaust gases only pass through inlet tube 60 when the back pressure at the inlet end 34a of catalytic converter 30 exceeds 7 inches of water. If a check valve or pressure release valve is employed, they are normally closed and only open when the back pressure exceeds 7 inches of water. There is an additional inlet tube 60 connected to the inlet opening 52 of pressure relief device 50 for receiving the exhaust gases in order to lower the back pressure of those aforementioned exhaust gases, when the auxiliary catalytic converter 30 is placed within the exhaust emission system 10.

In using an auxiliary catalytic converter without a back pressure relief device within an exhaust emission system 10, it has been observed that when an excess back pressure of gases above a predetermined level is reached (greater than seven (7) inches of water pressure), the operation of the exhaust emission system 10 is hindered and the efficiency of the emission system 10 is reduced, as shown in Table 1. Using an auxiliary catalytic converter 30 having a back pressure relief device 50 allows the exhaust gases to flow more evenly without any reduction in the efficiency of reducing exhaust gas emissions, as shown in Table 1. In addition, the back pressure relief device 50 allows for a higher cell density of catalytic layered substrates 36 within matrix core 34 which results in a higher reduction of pollutant emissions. Some conditions that cause an increase in the back pressure of exhaust emission system 10 are heavy acceleration of the motor vehicle, wide open throttle operation, a sudden increase in vehicle load (climbing a steep hill), and the like.

It is also been observed that when the auxiliary catalytic converter 30 is in use, the converter 30 will slow the travel time of exhaust gases through the main catalytic converter 16, such that the added residence time through the main catalytic converter 16 further reduces the emission of gaseous pollutants from the exhaust emission system 10 during the operational use of the motor vehicle. Back pressure of the exhaust gases should be in the range of 2 to 7 inches of water within the exhaust system 10 for proper efficiency in reducing exhaust gas emissions.

Housing 32 is made of ceramic, steel, stainless steel, chrome, or other suitable materials. The core matrix 34 is made of mesh, honeycomb, or other suitable passageway designs for containing the catalytic layered materials 36. The catalytic layered materials 36 have a precious metal catalyst contained thereon. Typical catalysts used are platinum, palladium, rhodium, and/or nickel. The housing 32 of auxiliary catalytic converter 30 is typically dimensioned so that the outside diameter closely approximates the inside diameter of exhaust pipe 18 or tailpipe 22. The diameter size of housing 32 may be in the range of ½ inches to 8 inches, and the housing 32 may have a length of ¾ inches to 11 inches, depending upon the application, such as in a car, truck, motorcycle, lawn mower, gasoline-type generator and/or internal combustion engine.

The preferred specification of matrix core 34 includes a diameter which matches the exhaust pipe or tailpipe of 1¾ inches and a length of 1¾ inches and having a range of 200 to 700 cells per square inch. Typically, two, three, or four of such matrix cores 34 are stacked together to make the auxiliary catalytic converter 30 or with a preferred single integral matrix core 34 having a length of 6 inches. The matrix core 34 is coated with alumina to about 12% (weight to weight) and has a catalytic layered material plating 36 of palladium and platinum in the range 30 to 50 grams per cubic foot with a ratio of palladium to platinum in the range of 2:1 to 6:1.

The auxiliary catalytic converter 30 is held in place in exhaust pipe 18 or tailpipe 22 by a suitable mounting clamp 38, as depicted in FIGS. 1A, 1B and 2. It can also be securely held by other suitable means, such as hose clamps, muffler clamps, compression fittings, mounting brackets, mounting screws, welding, crimping, and the like.

DETAILED DESCRIPTION OF THE SECOND EMBODIMENT 100

Figure 3:
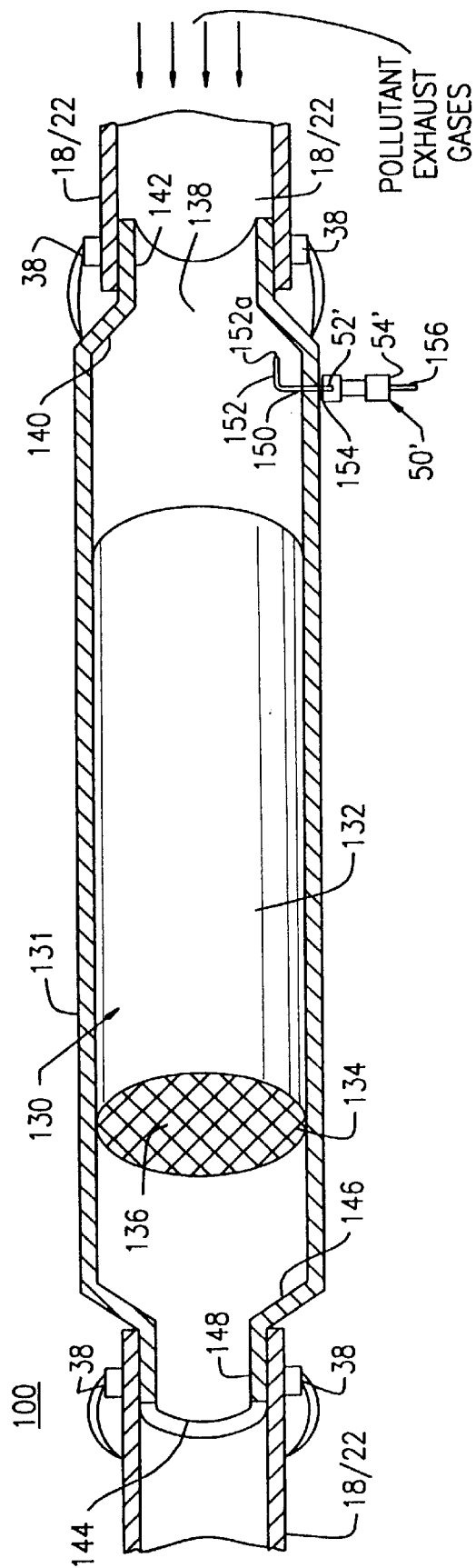
FIG. 3 is a cross-sectional perspective view of the second embodiment of the present invention showing the major component parts contained therein and in operational use.

The second embodiment 100 of the auxiliary catalytic converter 130 is depicted in detail in FIG. 3 of the drawings. Auxiliary catalytic converter 130 includes a large sized canister-type housing 131 having a large sized diameter core housing 132 having a single integral matrix core 134 of catalytic layered material 136 (as described in the preferred embodiment). Housing 131 has at the inlet opening 138 a tapered end 140 with a neck portion 142 for slidably inserting into exhaust pipe 18 or tailpipe 22; and at the outlet opening 144 a tapered end 146 with a neck portion 148 for slidably inserting into the exhaust pipe 18 or tailpipe 22. In addition, housing 131 at the side of the inlet opening 138, as shown in FIG. 3 of the drawings, includes a circular hole opening 150 for receiving an L-shaped inlet tube 152 having an outlet end 154 for receiving the back pressure relief device 50'.

The back pressure relief device 50' can be in the form of a bleed valve, a miniature check valve, a miniature pressure release valve, or any other suitable devices. In this second embodiment 100, the back pressure relief device is in the form of a miniature check valve 50'. Check valve 50' is normally in the closed position and only opens to release the excess exhaust gases when the back pressure at the inlet tube opening 152a of L-shaped inlet tube 152 exceeds the 7 inches of water back pressure. If a bleed valve is employed, the valve is always opened and is dimensionally sized such that the excess exhaust gases only pass through when the back pressure exceeds 7 inches of water. If a pressure relief valve is employed, the valve is normally closed and only opens when the back pressure exceeds 7 inches of water.

Check valve 50' includes an inlet opening 52' and an outlet opening 54', such that inlet opening 52' connects to the outlet end 154 of L-shaped inlet tube 152, and outlet opening 54' connects to an outlet tube 156 for discharging the excess back pressure of the exhaust emissions to the atmosphere. Housing 131 is secured to the exhaust pipe 18 or tailpipe 22 by means of clamps 38, welding, crimping or the like. In addition, the tapered and conical configuration of housing 131 also reduces noise and becomes an additional vehicle muffler.

The physical specifications for housing 131 has an overall diameter in the range of 3½ inches to 4½ inches and overall length in the range of 3 inches to 15 inches, with a preferred overall diameter of 4⅛ inches and a preferred length of 4 inches. Housing 131 has inlet and outlet openings 138 and 144 of tapered ends 140 and 146 having a diameter of less than 2 inches for inserting the neck portions 142 and 148 into the exhaust pipe 18 or tailpipe 22 for a proper fit. The physical specification for core housing 132 having a matrix core 134 has an overall diameter of 4 inch by 4 inches in length.

DETAILED DESCRIPTION OF THE THIRD EMBODIMENT 200

Figure 4:
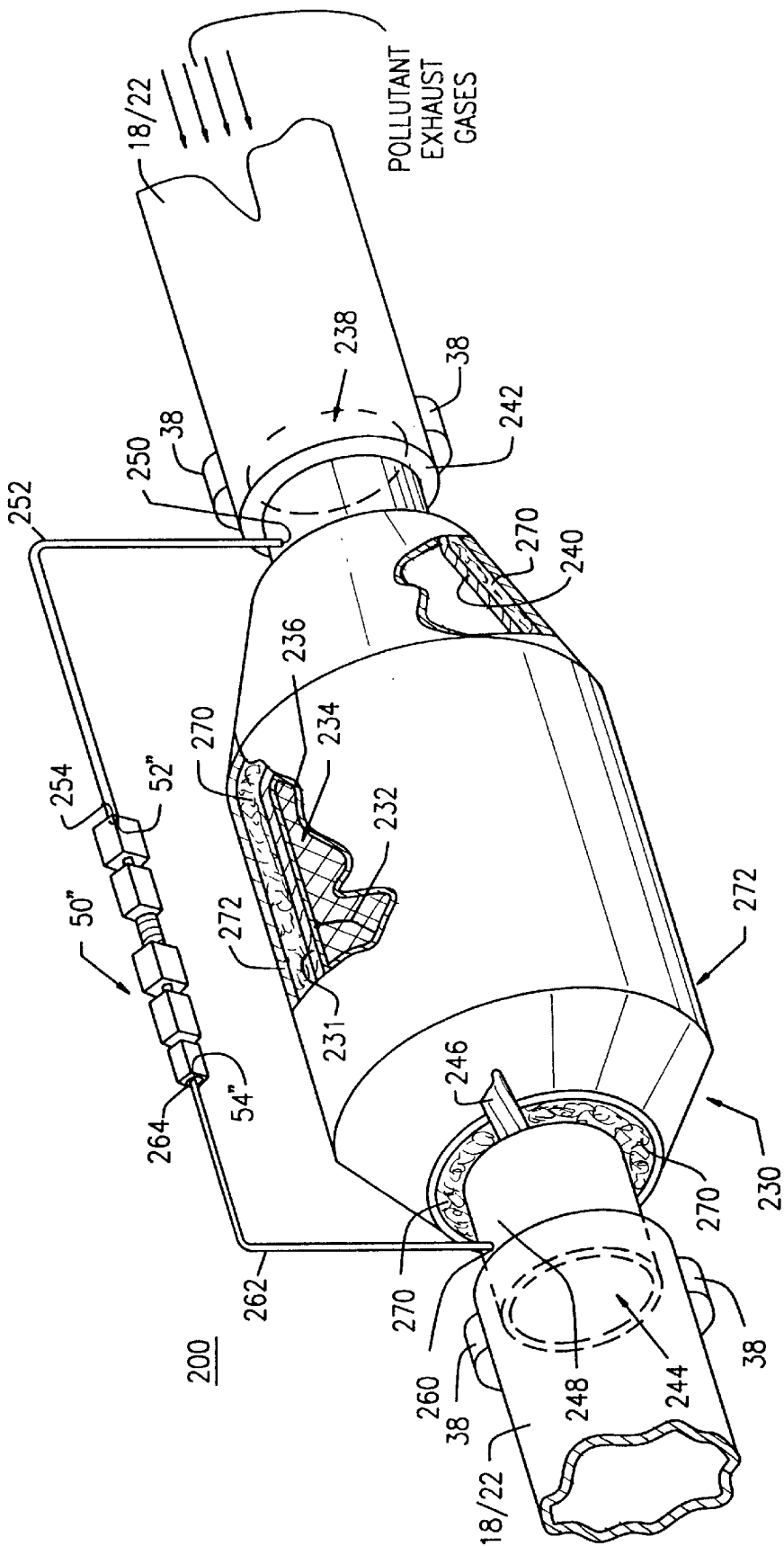
FIG. 4 is a perspective view of the auxiliary catalytic converter of the third embodiment of the present invention showing the major component parts contained therein.
Figure 5:
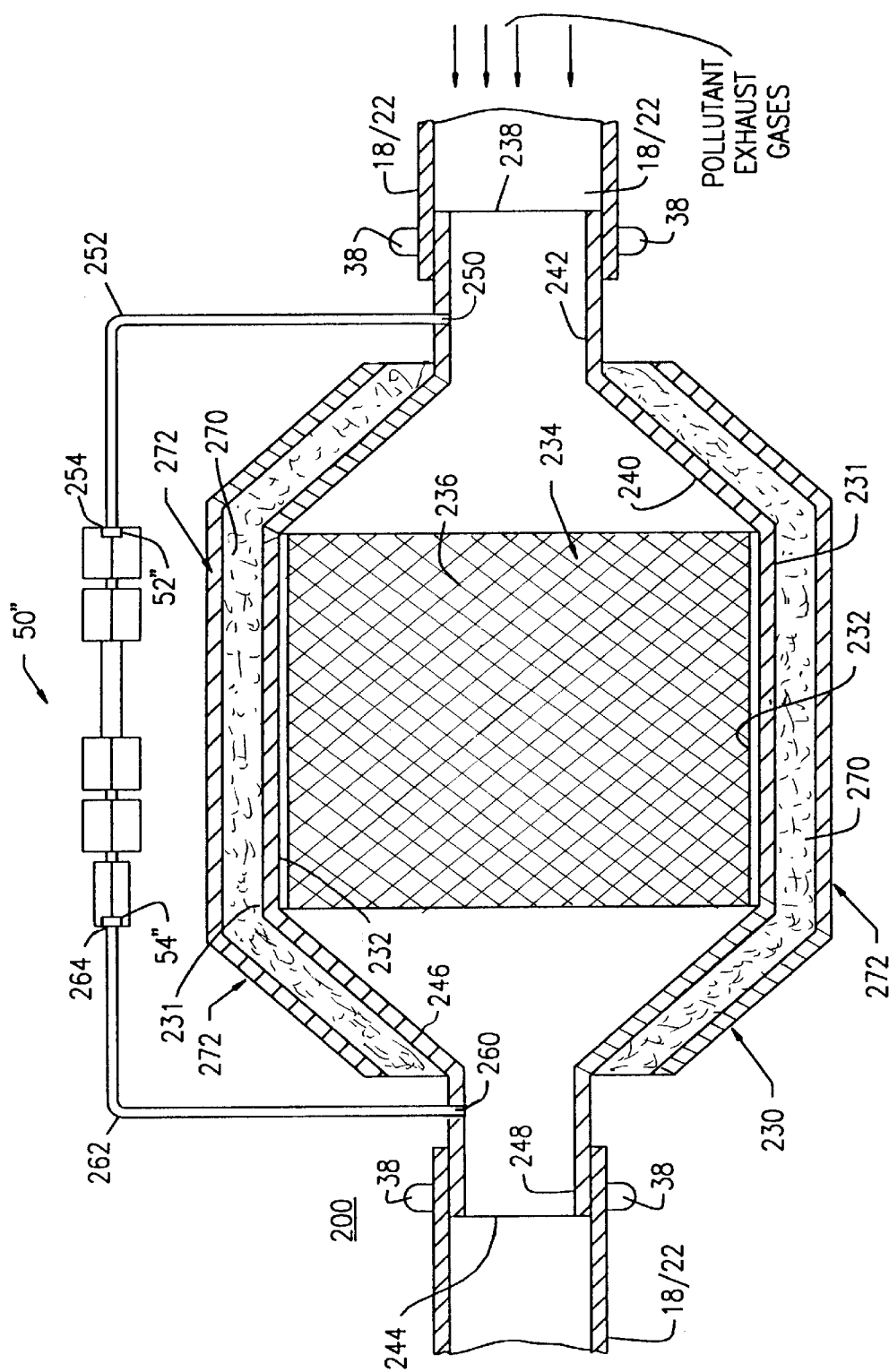
FIG. 5 is a cross-sectional side elevational view of the auxiliary catalytic converter of the third embodiment of the present invention showing the major component parts contained therein and in operational use.

The third embodiment 200 of the auxiliary catalytic converter 230 is depicted in detail in FIGS. 4 and 5 of the drawings. Auxiliary catalytic converter 230 includes a large sized canister-type housing 231 having a large sized diameter core housing 232 having a single integral matrix core 234 of catalytic layered material 236 (as described in the preferred embodiment). Housing 231 has at the inlet opening 238 a tapered end 240 with a neck portion 242 for slidably inserting into exhaust pipe 18 or tailpipe 22; and at the outlet opening 244 a tapered end 246 with a neck portion 248 for slidably inserting into the exhaust pipe 18 or tailpipe 22. In addition, housing 231 at the side of inlet neck portion 242, as shown in FIG. 5 of the drawings, includes a first circular hole opening 250 for receiving an L-shaped inlet tube 252 having an outlet end 254 for receiving a back pressure relief device 50"; and the outlet neck portion 248 side includes a second circular hole opening 260 for receiving an L-shaped outlet tube 262 having an inlet end 264 in which to receive the back pressure relief device 50" or pressure release valve 50".

The back pressure relief device 50" can be in the form of a bleed valve, a miniature check valve, a miniature pressure release valve, or any other suitable devices. In this third embodiment 200 the back pressure relief device is in the form of a miniature pressure release valve 50". Pressure release valve 50" is normally in the closed position and only opens to release the excess exhaust gases when the back pressure at first circular hole opening 250 of L-shaped inlet tube 252 is over the 7 inches of water back pressure. If a bleed valve is employed, the valve is always opened and is dimensionally sized such that the excess exhaust gases only pass through when the back pressure exceeds 7 inches of water. If a check valve is employed, the valve is normally closed and only opens when the back pressure exceeds 7 inches of water. Back pressure relief valve 50" includes inlet and outlet openings 52" and 54", such that inlet opening 52" connects to the outlet end 254 of L-shaped inlet tube 252 and outlet opening 54" connects to the inlet end 264 of outlet tube 262 for discharging the excess back pressure within the exhaust emissions system 10. Housing 231 is secured to the exhaust pipe 18 or tailpipe 22 by means of clamps 38, welding, crimping or the like. In addition, the tapered and conical configuration of housing 231 also reduces noise and becomes an additional vehicle muffler.

In addition, the auxiliary catalytic converter 230 further includes an insulation layer 270 that surrounds the exterior of housing 231. Insulation layer 270 is held in place by an outer canister-type shell 272, as depicted in FIGS. 4 and 5 of drawings.

In operation, the emission removal efficiency was increased from baseline by using an insulated auxiliary catalytic converter 230 because the emission exhaust gases were still maintained at a relatively high temperature (500° F. to 800° F.) within the matrix core 234 of the auxiliary catalytic converter 230. Shell 272 is made of steel, stainless steel, chrome or other suitable materials. Insulation layer 270 is made of high temperature fiberglass, silicon fiberglass, intumescent coated materials, asbestos, and the like.

The physical specifications for housing 231 has an overall diameter in the range of 3½ inches to 4½ and overall length in the range of 3 inches to 15 inches, with a preferred overall diameter of 4⅛ and a preferred length of 4 inches. Housing 231 has inlet and outlet openings 238 and 244 of tapered ends 240 and 246 having a diameter of less than 2 inches for inserting the neck portions 242 and 248 into the exhaust pipe 18 or tailpipe 22 for a proper fit. The physical specification for core housing 232 having a matrix core 234 has an overall diameter of 4 inches by 4 inches in length. The insulation layer 270 is approximately ½ of an inch in thickness. The overall diameter of the insulated auxiliary catalytic converter 230 is in the range of 4½ to 5½ inches, with a preferred overall diameter of 5⅛ inches.

The present invention has been tested on different vehicle exhaust systems 10, such as a 1989 Dodge Aires LE, a 1986 Dodge B350 Van and a 1990 Chevy Caprice. In these tests, as shown in Table 1, the catalytic converter 230 of the second embodiment 200 had a core housing 232 which measured 8 inches in length and had a diameter of 5 inches with a back pressure bleed valve 50" having an orifice diameter of 0.015 inches (orifice # 15 in Table 1). The matrix core 234 had a substrate diameter of 3.66 inches with 400 cells per inch of catalytic layered material 236 having a ratio of palladium to platinum of 2:1. In test group A the auxiliary catalytic converter 230 was located prior to the muffler system 20, (referred to as "pre-muff" in Table 1), as shown in FIG. 1A of the drawings. Test groups B and C had the auxiliary catalytic converter 230 located after the muffler system 20 and within the tailpipe section 22 (referred to as "post-muff" in Table 1), as shown in FIG. 1B of the drawings. Test groups D and E had the auxiliary catalytic converter 230 located before and after the muffler system 20 within the exhaust pipe section 18 on the tailpipe section 22, accordingly, as shown in FIGS. 1A or 1B of the drawings. In Table 1, "3.66" refers to the 3.66 inch diameter of matrix core 234 and "Baseline" refers to test groups A through E where there was no auxiliary catalytic converter at all used in measuring the exhaust emissions.

The test results are tabulated below in Table 1, which show a substantial reduction in exhaust emissions of THC, CO and $NO_x$ in test groups B/test number 4, test group C/test number 6, test group D/test number 9, and test group E/test number 12, when the catalytic convert 230 is mounted after the muffler system 20, as shown in FIG. 1B. There was an even a more substantial reduction in exhaust emissions in test group A/test number 2, test group D/test number 8 and test group E/test number 11 when the catalytic converter 230 was placed before the muffler system 20, as shown in FIG. 1A of the drawings. The best overall results occurred in test group A/test number 2 (when the catalytic converter 230 was located before the muffler system 20), such that the THC pollutants had a 63.6% reduction over baseline, the CO pollutant had a 65.6% reduction over baseline and the $NO_x$ pollutants had a 41.7% reduction over baseline.

TABLE 1

| Test Group | Unit Type | Test # | Make | Model | THC | CO | NOx | % Eff THC | % Eff CO | % Eff NOx |
|---|---|---|---|---|---|---|---|---|---|---|
| A | BASELINE | 1 | DODGE | AIRES | 0.220 | 7.970 | 1.140 | | | |
|   | 3.66 W/ORF #15 W/INS PRE-MUFF | 2 | DODGE | AIRES | 0.080 | 2.738 | 0.665 | 63.6 | 65.6 | 41.7 |
| B | BASELINE | 3 | DODGE | B350 VAN | 0.553 | 6.430 | 5.765 | | | |
|   | 3.66 W/ORF #15 W/INS POST-MUFF | 4 | DODGE | B350 VAN | 0.220 | 0.028 | 5.638 | 60.2 | 99.6 | 2.2 |
| C | BASELINE | 5 | CHEVY | CAPRICE | 1.108 | 16.433 | 3.673 | | | |
|   | 3.66 W/ORF #15 W/INS POST-MUFF | 6 | CHEVY | CAPRICE | 0.788 | 6.725 | 2.130 | 28.9 | 59.1 | 42 |
| D | BASELINE | 7 | DODGE | AIRES LE | 0.189 | 5.629 | 0.249 | | | |
|   | 3.66 W/ORF #15 BEFORE MUFFLER | 8 | DODGE | AIRES LE | 0.147 | 3.433 | 0.108 | 22.2 | 37.2 | 56.6 |
|   | 3.66 W/ORF #15 AFTER MUFFLER | 9 | DODGE | AIRES LE | 0.168 | 4.611 | 0.082 | 11.1 | 18.1 | 67.1 |
| E | BASELINE | 10 | DODGE | AIRES LE | 0.42 | 9.098 | 0.404 | | | |
|   | 3.66 W/ORF #15 BEFORE MUFFLER | 11 | DODGE | AIRES LE | 0.231 | 5.023 | 0.202 | 45 | 44.8 | 50 |
|   | 3.66 W/ORF #15 AFTER MUFFLER | 12 | DODGE | AIRES LE | 0.336 | 5.996 | 0.276 | 20 | 34.1 | 31.7 |

DETAILED DESCRIPTION OF THE FOURTH EMBODIMENT 300

Figure 6:
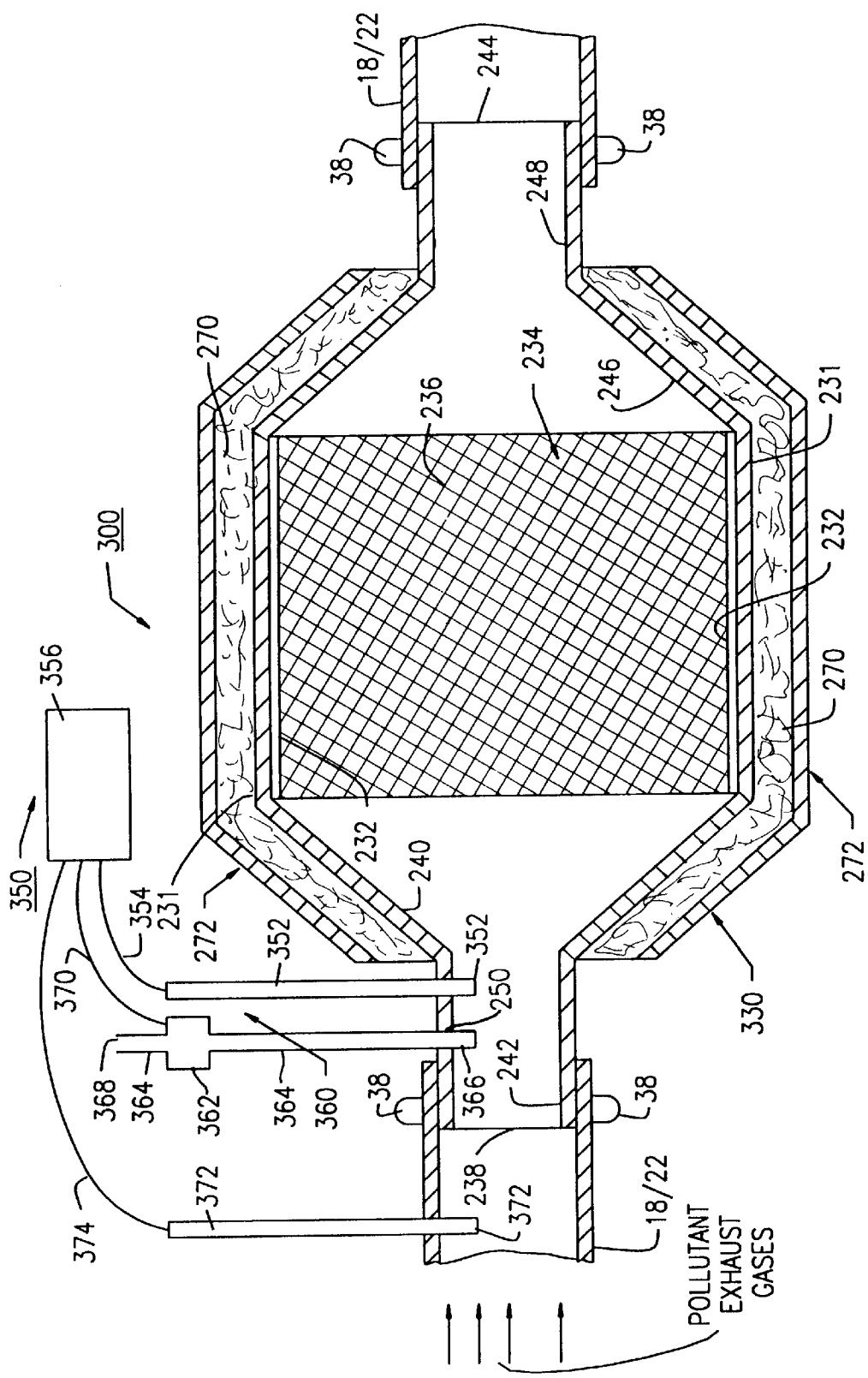
FIG. 6 is a cross-sectional side elevational view of the auxiliary catalytic converter of the fourth embodiment of the present invention showing the major component parts contained therein and in operational use.

The fourth embodiment 300 of the auxiliary catalytic converter 330 is depicted in detail in FIG. 6 of the drawings. All aspects of the auxiliary catalytic converter 330 of the fourth embodiment 300 are the same as the auxiliary catalytic converter 230 of the third embodiment 200, except for the addition of an electronically controlled automatic bypass system 350 in order to relieve back pressure of the pollutant exhaust gases within catalytic converter 330. This electronic back-pressure bypass system 350 is an alternative to the mechanical back pressure relief valve 50" of the third embodiment 200. The electronically controlled automatic back pressure bypass system 350 includes a first pressure transducer sensor 352 for measuring the back pressure of the pollutant exhaust gases inside the neck portion 242 of inlet opening 238 of auxiliary catalytic converter 330, and includes an electronic sensor wire 354 connected to an electronic bypass control unit 356. In addition, the bypass system 350 further includes a back pressure relief assembly 360 having a variable flow valve 362, an exhaust flow tube 364 having an inlet opening 366 and an outlet opening 368, and electrical control line 370 connected to the control unit 356 for exhausting pollutant exhaust gases via the flow valve 362 as required to maintain the proper back pressure. The variable flow valve 362 operates in such a manner as to allow for any amount of flow of exhaust gases to the atmosphere from a "no flow" condition to a "full flow" condition wherein exhaust gases are vented through a series of infinitely variable increments. Outlet opening 368 vents the pollutant exhaust gases to the atmosphere, or the exhaust gases can be run through another catalytic converter (not shown), or they simply may be diverted around the auxiliary catalytic converter 330 and fed back into the exhaust pipe 18 or tailpipe 22 to an exhaust gas recirculation system (not shown).

Further, the bypass system 350 additionally includes a second pressure transducer sensor 372 for also measuring the back pressure of the pollutant exhaust gases inside the exhaust piping 18 or in the tailpipe section 22 and includes an electronic sensor wire 374 also connected to the electronic bypass control unit 356. This pressure transducer sensor 372 has a variety of purposes, and is primarily for acting as a check procedure to ensure that the flow valve 362 has opened when the back pressure valve exceeded its limit of over 7 inches of water. If flow valve 362 does not open, then the back pressure sensed by pressure transducer sensor 372 should be the same as sensed by pressure transducer sensor 352. Sensor 372 also measures the back pressure within the entire exhaust system 10, and if the back pressure is too high, control unit 356 adjusts the flow valve 362 to compensate and to lower the back pressure below 7 inches of water.

In operation, as shown in FIG. 6 of the drawings, as the pollutant exhaust gases enter into the auxiliary catalytic converter 330 through neck opening 238, the back pressure of the exhaust gases produced from engine block 12 are measured by the first pressure transducer sensor 352 at the neck portion 242 of neck opening 238. This sensor 352 then transmits an electronic signal via sensor wire 354 to the by-pass control unit 356, such that control unit 356 then actuates the variable flow valve 362 within the back pressure relief assembly 360 via the electrical control line 370 to open the variable flow valve 362. The flow valve 362 operates to maintain a level of 7 inches of water of back pressure in the neck portion 242 of the catalytic converter 330 and allows only a small portion of the exhaust gases to enter inlet opening 366 of exhaust flow tube 364. In order to maintain the level of back pressure below 7 inches of water at inlet opening 238 of the auxiliary catalytic converter 330, the exhaust gases pass through flow valve 362 and the excess gases are vented to the atmosphere via outlet opening 360 of exhaust flow tube 364. As previously mentioned, the second pressure transducer sensor 372 acts as a back-up for the first pressure transducer sensor 352 and performs the same functions thereof.

It should be understood that the various embodiments of the back pressure relief devices 50, 50', 50" and 350 described above may also be employed in conjunction with a main catalytic converter to relieve excess back pressure which may build up at the inlet end of the main catalytic converter. The excess exhaust gases from the back pressure relief devices 50, 50', 50" and 350 are fed back into an exhaust gas recirculation system 400, as shown in FIG. 1B of the drawings.

ADVANTAGES OF THE PRESENT INVENTION

Accordingly, an advantage of the present invention is that it provides for an auxiliary or second catalytic converter having a back pressure relief valve disposed downstream of the main catalytic converter or downstream of the muffler to maintain efficiency and to thereby further reduce exhaust gas emissions to meet federal and state emission standards.

Another advantage of the present invention is that it provides for an auxiliary catalytic converter having a back pressure relief valve that maintains the back pressure of the emission system at a predetermined level.

Another advantage of the present invention is that it provides for an auxiliary catalytic converter having a back pressure relief valve that allows excess back pressure to be diverted from the auxiliary catalytic converter and to bypass the inner core to maintain the efficiency of the system.

Another advantage of the present invention is that it provides for an auxiliary catalytic converter having a back pressure relief valve that is in the form of either a bleed valve, or a miniature check valve, or a miniature pressure relief valve for relieving any build-up of pressure within the emission system at the inlet side of the auxiliary catalytic converter to maintain the efficiency of the system.

Another advantage of the present invention is that it provides for an auxiliary catalytic converter that will slow the travel time of exhaust gases through the main catalytic converter, such that the added residence time through the main catalytic converter will further reduce the emission of gaseous pollutants from the exhaust emission system of the motor vehicle while in use.

Another advantage of the present invention is that it provides for an auxiliary catalytic converter disposed downstream of the main catalytic converter and before the end of the tailpipe that is easy and simple to connect to the exhaust piping by mounting clamps, hose clamps, muffler clamps, compression fittings, mounting brackets, mounting screws, welding, crimping, or the like.

Another advantage of the present invention is that it provides for an auxiliary catalytic converter that is mounted internally within the emission exhaust piping between the main catalytic converter and the end of the tailpipe.

Another advantage of the present invention is that it provides for an auxiliary catalytic converter that in operational use performs with no reduction or loss of horsepower to a vehicle.

Another advantage of the present invention is that it provides for an auxiliary catalytic converter that in operational use provides substantially cleaner air emissions for a vehicle having installed the auxiliary catalytic converter of the present invention.

A further advantage of the present invention is that it provides for an auxiliary catalytic converter for an emission system that is only changed at every 50,000 to 100,000 miles of driving use.

A still further advantage of the present invention is that it provides for an auxiliary catalytic converter for an emission system which can be mass produced in an automated and economical manner and is relatively inexpensive and long lasting.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An exhaust system for a vehicle having exhaust piping, said exhaust piping having an exhaust tailpipe with an open end, a main catalytic converter disposed in said exhaust piping, a muffler, and an auxiliary catalytic converter disposed in said exhaust piping, comprising:
   a) a main catalytic converter disposed in said exhaust piping; an auxiliary catalytic converter including a housing having an exterior wall and an inner core of catalytic material disposed in said housing for chemically reducing pollutant gaseous emissions; said auxiliary catalytic converter having an inner end and an outer end;
   b) said auxiliary catalytic converter being disposed within said exhaust piping of said exhaust system, and being disposed between said main catalytic converter and the open end of said exhaust tailpipe; wherein said outer end is adjacent to said open end;
   c) means for fixedly attaching said auxiliary catalytic converter to said exhaust piping; and
   d) means for relieving back pressure within said exhaust system between said main catalytic converter and said auxiliary catalytic converter by diverting exhaust gases to bypass said auxiliary catalytic converter when the pressure of said exhaust gases at said inner end of said auxiliary catalytic converter increases above a predetermined pressure level, said means for relieving back pressure being located at said inner end of said auxiliary catalytic converter; wherein said means for relieving back pressure within said exhaust system includes valve means selected from the group consisting of a bleed valve, a check valve, a pressure relief valve, and an electronically-controlled flow valve; and wherein said valve means includes means for maintaining the back pressure within said exhaust system at a level above 2 inches of water and below 7 inches of water.

2. An exhaust system in accordance with claim 1, wherein said means for relieving back pressure further includes a pipe extending through said inner core of said auxiliary catalytic converter, said pipe having a first end disposed at the inner end of said auxiliary catalytic converter and having a second end disposed at the outer end of said auxiliary catalytic converter, and said valve means being connected to said first end and being disposed at said inner end of said auxiliary catalytic converter.

3. An exhaust system in accordance with claim 1, wherein said means for relieving back pressure further includes a tube having an outer section extending through said exterior wall of said housing to the atmosphere and is disposed at the inner end of said auxiliary catalytic converter, and said valve means being connected to said tube outer section.

4. An exhaust system in accordance with claim 1, wherein said means for relieving back pressure further includes a first tube extending through said exterior wall of said housing at an inner end of said housing, a second tube extending through the exterior wall of said housing at an outer end of said housing, said valve means being connected between said first and second tubes.

5. An exhaust system in accordance with claim 1, wherein said means for relieving back pressure further includes an electronically controlled back-pressure bypass system having a pressure transducer sensor extending through the exterior wall of said housing at an inner end of said housing for sensing the exhaust pressure at said inner end of said auxiliary catalytic converter; a tube connected to said valve means extending through the exterior wall of said housing at the inner end of said housing and upstream from said pressure transducer sensor for venting of exhaust gases to the atmosphere at said inner end of said auxiliary catalytic converter; control means connected to said pressure transducer sensor and said valve means for controlling said valve means in response to input from said pressure transducer sensor.

6. An exhaust system in accordance with claim 5, further including another pressure transducer sensor extending through said exterior wall of said exhaust piping and connected to said control means for obtaining another pressure reading of the exhaust gases in said exhaust piping.

7. An exhaust system in accordance with claim 1, wherein said catalytic material has a catalytic substrate of platinum and rhodium, or platinum and palladium.

8. An exhaust system in accordance with claim 1, wherein said means for fixedly attaching is selected from the group consisting of hose clamps, muffler clamps, compression fittings, mounting brackets, mounting screws, welding, and crimping.

9. An exhaust system in accordance with claim 1, wherein said inner core of catalytic material, is an integral unit disposed in said housing.

10. An exhaust system in accordance with claim 1, wherein said auxiliary catalytic converter has a diameter in the range of ½ inches to 8 inches and a length in the range of ¾ to 11 inches.

11. An exhaust system in accordance with claim 1, wherein said auxiliary catalytic converter has a diameter in the range of 3½ inches to 4½ inches and a length in the range of 3 inches to 15 inches.

12. An exhaust system for a vehicle having exhaust piping, said exhaust piping having an exhaust tailpipe with an open end, a main catalytic converter disposed in said exhaust piping, a muffler, and an auxiliary catalytic converter disposed in said exhaust piping, comprising:
   a) a main catalytic converter disposed in said exhaust piping; an auxiliary catalytic converter including a housing having an exterior wall and an inner core of catalytic material disposed in said housing for chemically reducing pollutant gaseous emissions; said auxiliary catalytic converter having an inner end and an outer end;
   b) said inner end of said auxiliary catalytic converter having tapered ends for insertion of said housing into said exhaust piping of said exhaust system;
   c) means for fixedly attaching said auxiliary catalytic converter to said exhaust system; and
   d) means for relieving back pressure within said exhaust system between said main catalytic converter and said auxiliary catalytic converter by diverting exhaust gases to bypass said auxiliary catalytic converter when the pressure of said exhaust gases at said inner end of said auxiliary catalytic converter increases above a predetermined pressure level, said means for relieving back pressure being located at said inner end of said auxiliary catalytic converter; wherein said means for relieving back pressure within said exhaust system includes a valve means selected from the group consisting of a bleed valve, a check valve, a pressure relief valve, and an electronically-controlled flow valve; and wherein said valve means includes means for maintaining the back pressure within said exhaust system at a level above 2 inches of water and below 7 inches of water.

13. An exhaust system in accordance with claim 12, wherein said means for relieving back pressure further includes a pipe extending through said inner core of said auxiliary catalytic converter, said pipe having a first end disposed at the inner end of said auxiliary catalytic converter and having a second end disposed at the outer end of said auxiliary catalytic converter, and said valve means being connected to said first end and being disposed at said inner end of said auxiliary catalytic converter.

14. An exhaust system in accordance with claim 12, wherein said means for relieving back pressure further includes a tube having an outer section extending through said exterior wall of said housing to the atmosphere and is disposed at the inner end of said auxiliary catalytic converter, and said valve means being connected to said tube outer section.

15. An exhaust system in accordance with claim 12, wherein said means for relieving back pressure further includes a first tube extending through said exterior wall of said housing at an inner end of said housing, a second tube extending through the exterior wall of said housing at an outer end of said housing, said valve means being connected between said first and second tubes.

16. An exhaust system in accordance with claim 12, wherein said means for relieving back pressure further includes an electronically controlled back-pressure bypass system having a pressure transducer sensor extending through said exterior wall of said housing at an inner end of said housing for sensing the exhaust pressure at said inner end of said auxiliary catalytic converter; a tube connected to said valve means extending through the exterior wall of said housing at the inner end of said housing and upstream from said pressure transducer sensor for venting of exhaust gases to the atmosphere at said inner end of said auxiliary catalytic converter; control means connected to said pressure transducer sensor and said valve means for controlling said valve means in response to input from said pressure transducer sensor.

17. An exhaust system in accordance with claim 16, further including another pressure transducer sensor extending through said exterior wall of said exhaust piping and connected to said control means for obtaining another pressure reading of the exhaust gases in said exhaust piping.

18. An exhaust system in accordance with claim 12, wherein said catalytic material has a catalytic substrate of platinum and rhodium, or platinum and palladium.

19. An exhaust system in accordance with claim 12, wherein said means for fixedly attaching is selected from the group consisting of hose clamps, muffler clamps, compression fittings, mounting brackets, mounting screws, welding, and crimping.

20. An exhaust system in accordance with claim 12, wherein said inner core of catalytic material is an integral unit disposed in said housing.

21. An exhaust system in accordance with claim 12, wherein said auxiliary catalytic converter has a diameter in the range of ½ inches to 8 inches and a length in the range of ¾ to 11 inches.

22. An exhaust system in accordance with claim 12, wherein said auxiliary catalytic converter has a diameter in the range of 3½ inches to 4½ inches and a length in the range of 3 inches to 15 inches.

23. An exhaust system in accordance with claim 12, wherein a section of the housing containing said inner core of catalytic material has a diameter larger than the diameter of said exhaust piping of said exhaust system.

24. An exhaust system in accordance with claim 12, wherein a section of the housing containing said inner core of catalytic material has a diameter substantially equal to the diameter of said exhaust piping of said exhaust system.

25. An exhaust system in accordance with claim 12, wherein said housing has an inlet end and an outlet end which are each tapered to form a reduced size opening for noise reduction.

26. An exhaust system in accordance with claim 12, further including another housing surrounding said housing and defining a space therebetween; and insulation being disposed in said space for preventing loss of heat from said inner core.

27. An exhaust system for a vehicle having exhaust piping, said exhaust piping having an exhaust tailpipe, a catalytic converter disposed in said exhaust piping, and a muffler, comprising:
   a) a catalytic converter including a housing having an exterior wall and an inner core of catalytic material disposed in said housing for chemically reducing pollutant gaseous emissions; said catalytic converter having an inlet end and an outlet end;

b) said catalytic converter being disposed within said exhaust piping of said exhaust system; and c) means for relieving back pressure within said exhaust system by diverting exhaust gases to bypass said catalytic converter when the pressure of said exhaust gases at said inlet end of said catalytic converter increases above a predetermined pressure level, said means for relieving back pressure being located at said inlet end of said catalytic converter; wherein said means for relieving back pressure within said exhaust system includes a valve means selected from the group consisting of a bleed valve, a check valve, A pressure relief valve, and an electronically-controlled flow valve; and wherein said valve means includes means for maintaining the back pressure within said exhaust system at a level above 2 inches of water and below 7 inches of water.

28. An exhaust system in accordance with claim 27, wherein said means for relieving back pressure further includes a pipe extending through said inner core of said catalytic converter having a first end disposed at the inlet end of said catalytic converter and having a second end disposed at the outlet end of said catalytic converter, and said valve means being connected to said first end and being disposed at said inlet end of said catalytic converter.

29. An exhaust system in accordance with claim 27, wherein said means for relieving back pressure further includes a tube having an outer section extending through said exterior wall of said housing to the atmosphere and is disposed at the inner end of said catalytic converter, and said valve means being connected to said tube outer section.

30. An exhaust system in accordance with claim 27, wherein said means for relieving back pressure further includes a first tube extending through said exterior wall of said housing at an inlet end of said housing, a second tube extending through the exterior wall of said housing at an outlet end of said housing, said valve means being connected between said first and second tubes.

31. An exhaust system in accordance with claim 27, wherein said means for relieving back pressure further includes an electronically controlled back-pressure bypass system having a pressure transducer sensor extending through said exterior wall of said housing at an inlet end of said housing for sensing the exhaust pressure at said inlet end of said catalytic converter; a tube connected to said valve means extending through the exterior wall of said housing at the inlet end of said housing and upstream from said pressure transducer sensor for venting of exhaust gases; control means connected to said pressure transducer sensor and said valve means for controlling said valve means in response to input from said pressure transducer sensor.

32. An exhaust system in accordance with claim 31, further including another pressure transducer sensor extending through said exterior wall of said exhaust piping and connected to said control means for obtaining another pressure reading of the exhaust gases in said exhaust piping and being upstream of said catalytic converter.

* * * * *